2,976,218

PRODUCTION OF L-LYSINE FROM SYNTHETIC DIAMINOPIMELIC ACID

Bert S. Gorton, Wilmington, Del., and Norman L. Hause, West Chester, Pa., assignors to E. I. du Pont de Nemours and Company, Wilmington, Del., a corporation of Delaware No Drawing. Filed Mar. 20, 1958, Ser. No. 722,638

9 Claims. (Cl. 195—29)

This invention relates to the production of L-lysine, and is more particularly concerned with a process for converting chemically synthesized diaminopimelic acid to L-lysine in high yield.

Diaminopimelic acid is a known compound which results from biological processes and has also been prepared synthetically from dibromopimelic acid and phthalimide as disclosed by E. Work et al., J. Am. Chem. Soc. 77, 1916 (1955). A chemical synthesis has recently been discovered in which glutaraldehyde is converted to trimethylene-bis-(5,5')-hydantoin by reaction with hydrogen cyanide, ammonia and carbon dioxide in solution and this is hydrolyzed to give α,ε-diaminopimelic acid. Synthetic diaminopimelic acid is a mixture of isomers which, unlike that from biological sources, includes a substantial proportion of the D-diaminopimelic acid isomer.

L-lysine is a valuable amino acid. A monodecarboxylation of L-diaminopimelic acid would give L-lysine as illustrated by the following reaction:

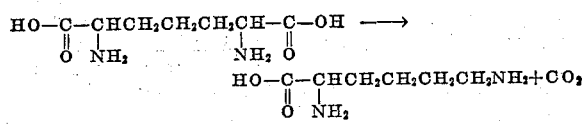

Dewey, Hoare and Work, Biochemical Journal 58, 523 (1954), disclose the isolation of a diaminopimelic acid decarboxylase from *Aerobacter aerogenes* and the use of this monodecarboxylation enzyme to convert diaminopimelic acid to L-lysine. They disclose substantially theoretical yields of L-lysine from biologically prepared diaminopimelic acid, but yields of only 45% to 48% from synthetic diaminopimelic acid. The D-diaminopimelic acid present in the synthetic product is not affected by the enzyme and can be recovered unchanged. The enzymatic process accomplishes the desirable purpose of providing L-lysine free of D-lysine, but would not be economically feasible in the absence of a market for the unchanged diaminopimelic acid. Since a process for preparing L-lysine which gives substantially theoretical yields from chemically synthesized diaminopimelic acid is preferable for a commercially practical process, it is important to improve the yield of L-lysine obtained from this synthetic starting material.

It is an object of this invention to provide improvements in the enzymatic process for producing L-lysine which will enable high yields to be obtained from synthetic diaminopimelic acid. Other objects will become apparent from the specification and claims.

In accordance with the present invention it has been found that the substantial proportion of synthetic diaminopimelic which is not converted to L-lysine by monodecarboxylation enzymes can be recovered unchanged and heated in dilute aqueous acid solution at 125° to 230° C. to provide a form of diaminopimelic acid which can be converted to L-lysine in yields of 62 to 70% or higher by an enzymatic decarboxylation process. Furthermore, this process can be repeated to convert substantially all of a chemically synthesized diaminopimelic acid to L-lysine.

The step of heating the unchanged diaminopimelic acid in acid solution is suitable for racemization of D-diaminopimelic acid, but the combination of this step with the enzymatic decarboxylation step provides unexpectedly high yields in comparison with results obtained with amino acids. For example, racemization of D-lysine and conversion to cadaverine with L-lysine decarboxylase would give maximum yields of only 50%, since the racemic lysine would still contain 50% of the D-lysine which is not affected by this enzyme. Furthermore, in the process of the present invention, racemization with dilute alkaline solution instead of the dilute acid solution does not give equivalent results; experiments with this modification actually resulted in yields of L-lysine of only 15% and 21%. Hence although it will be convenient to refer to the acid treatment as a racemization step, the treatment has a special significance in the process of this invention.

Suitable conditions for the racemization are to prepare a 0.5% to 50% aqueous solution of diaminopimelic acid in 0.1 to 12 normal acid and heat the solution at 125° to 230° C. However, the rate of racemization becomes quite slow at the lower temperatures, and diaminopimelic acid undergoes some decomposition at the higher temperatures. Hence, temperatures of 150° to 200° C. are preferred. Treatment of a 0.5% solution of diaminopimelic acid in 5 normal hydrochloric acid at 150° to 200° C. for about 1 hour is adequate, although shorter times can be used with correspondingly lower yields in the subsequent conversion of L-lysine, and longer times can be used to improve the subsequent yields.

Hydrochloric acid is preferred because, at the conclusion of the treatment, it can be removed readily by evaporating the solution and recovered for reuse. However, any acid which forms salts of amino acids and which does not destroy the diaminopimelic acid can be used. Thus, sulfuric acid and phosphoric acid are effective and can be removed by forming the insoluble calcium or barium salts and filtering the solution of diaminopimelic acid. Ion exchange resin in the acid form is also suitable and can be reused after treatment with acid. Racemization can also be accomplished with 0.1 to 10 normal aqueous solutions of alkalies, such as sodium hydroxide, potassium hydroxide or barium hydroxide, under conditions which are otherwise the same, but the treatment is much less effective than acid treatment, as previously discussed.

The manipulative procedure used in conducting the racemization follows conventional practice for racemization of other isomeric compounds and is not critical. Thus the solution will be kept under sufficient pressure in suitable apparatus to avoid boiling and loss of any volatiles used. At the end of the treatment the pressure will be released and evaporation to dryness will remove hydrochloric acid. An aqueous solution of the treated diaminopimelic acid is then formed and adjusted to a pH of 6.5 to 8.5 with acid or alkali in preparation for enzymatic decarboxylation to L-lysine.

The monodecarboxylation enzymes are prepared by conventional procedures, as in the manner disclosed by Gale and Epps, Biochem. J. 38, 232 (1944). Preferably, the organism is collected from its growth medium by centrifugation, washed once with water, stirred with an organic solvent, separated from the solvent by decantation or filtration, and allowed to dry. The resulting dry powder can be stored in a refrigerator for several months without appreciable deterioration. Suitable organic solvents include acetone and chloroform. Toluene, ether or glycerol are much less effective. Alternatively, a suspension of the cells in an aqueous solution of phosphate buffer at about 7.5 pH can be subjected to ultrasonic vibrations, as at 10 kilocycles for 10 minutes at 0.85 ampere. The resulting sonicate is as active as the dry powder prepared with acetone, but must be used on the same day that it is prepared. The preferred source of enzymes is *Aerobacter aerogenes*, such as the strains ATCC 12409 or ATCC 8724, but several other organisms provide suitable enzymes for decarboxylation of synthetic diaminopimelic acid to L-lysine. Somewhat less efficient are the enzymes from *Bacillus spaericus* ATCC 10208 and strains of *Escherichia coli* which do not require lysine for growth, such as the strain ATCC 12408. Among others found to be suitable but still less effective are *Sarcina lutea* ATCC 1001 and *Sarcina ureae* ATCC 6473.

The enzymatic decarboxylation reaction to form L-lysine is conducted in the same manner with the initial chemically synthesized diaminopimelic acid and with the diaminopimelic acid recovered from a partial conversion and treated in accordance with this invention for further conversion. A 0.1% to 3% aqueous solution of the diaminopimelic acid at a pH of 6.5 to 8.5 is mixed with 5 to 20 parts of the enzymes per 1000 parts of the solution at a temperature of 20° to 45° C. for several hours. The course of the reaction can be followed by measuring the carbon dioxide liberated. The preferred conditions for the reaction are a concentration of about 3% diaminopimelic acid, about 5 parts of enzymes per 1000 parts of solution, about 7.5 pH and a temperature of about 25° C. at which heating or cooling is not required. Under these conditions the reaction is substantially complete in 15 hours. The reaction mixture is then filtered to remove solids and the filtrate is contacted with a strong acid cation exchange resin in the ammonium form to remove L-lysine. The unchanged diaminopimelic acid remains in solution and is recovered by contacting the solution with a strong acid cation exchange resin in acid form, removing the diaminopimelic acid from the resin with 5% to 15% ammonium hydroxide solution and evaporating this eluate to dryness. This gives diaminopimelic acid in sufficiently pure form for the purpose of this invention. The L-lysine absorbed by the first resin treatment can be recovered as illustrated in Example 2. Alternatively it can be removed with dilute sodium or potassium hydroxide solution, the eluate treated with a weak cation exchange resin to remove alkali ions, and the L-lysine recovered from solution by crystallization. Further purification is accomplished in conventionl manner.

The chemically synthesized diaminopimelic acid used as a starting material in the present invention can be prepared in any convenient manner. A suitable method is to charge a pressure vessel with, by weight 25 parts glutaraldehyde, 200 parts water, 14 parts hydrogen cyanide, and 34 parts ammonium carbonate and heat the mixture under pressure at 60° to 100° C. for 4 hours to form trimethylene-bis-(5,5')-hydantoin. The bis-hydantoin is crystallized from the resulting solution and recrystallized from ethanol-water. About 90% yield of hydantoin, based on the glutaraldehyde, is obtained having a melting point of 232–236° C. and analyzing C, 45.8; H, 5.15; N, 22.7 (calculated for $C_9H_{12}O_4N_4$: C, 45.0; H, 5.04; N, 23.3). This hydantoin is hydrolyzed to diaminopimelic acid by heating with 4 to 8 equivalents of concentrated hydrochloric acid for 4 hours at 150° to 200° C. under pressure. The product is obtained in over 90% yield, based on the hydantoin, by absorption on a strong acid cation exchange resin, washing the diaminopimelic acid off the resin with 15% ammonium hydroxide solution, and evaporating the eluate to dryness.

In the following examples, which illustrate specific embodiments of the invention, parts are by weight unless otherwise specified:

EXAMPLE 1

*Preparation of enzyme mixtures*

A culture of *Aerobacter aerogenes* ATCC 12409 was grown for 16 hours at 25° C. with vigorous stirring and aeration on the following medium which had previously been sterilized by autoclaving for 5 minutes at 15 pounds per square inch pressure.

|  | Percent by weight |
| --- | --- |
| $(NH_4)_2HPO_4$ | 0.5 |
| Cornsteep liquor | 0.5 |
| Glucose | 0.5 |

Dow Corning Antifoam A (a silicone type of defoamer) was added as an antifoam agent. The *Aerobacter aerogenes* cells were recovered from the liquor by centrifugation and washed once with water. The cells were poured with vigorous stirring into 5 volumes of acetone at room temperature. The mixture was stirred for 2 minutes and, after allowing the solution to stand until most of the cells had precipitated, the supernatant was decanted. The remaining solids were once again slurried with 5 volumes of acetone and after recovery by filtration allowed to air dry to a powder. Samples of this enzyme mixture were stored for several months at 5° C. without appreciable deterioration.

EXAMPLE 2

*Preparation of L-lysine and recovery of unchanged diaminopimelic acid*

A solution of 3 parts of synthetic diaminopimelic acid in 1000 parts of water whose pH had been adjusted to 7.5 with sodium hydroxide was stirred vigorously for 15 hours with 5 parts of the enzyme mixture prepared in Example 1. Ten parts of toluene was added to prevent bacterial growth. The solution was then filtered through diatomaceous earth filter aid and the filtrate was passed through 500 parts of a strong acid cation exchange resin (Dowex 50–8X mesh resin) in the ammonia form to remove the L-lysine formed. The resin was washed twice with water, and the washings and effluent were passed through 500 parts of a strong acid cation exchange resin in the acid form to remove unchanged diaminopimelic acid. After washing this resin thoroughly with water, the absorbed diaminopimelic acid was redissolved by washing with 5% ammonium hydroxide. The solution was evaporated to dryness to drive off the ammonia and recover the diaminopimelic acid. The L-lysine absorbed by the cation exchange resin used in the ammonium form was redissolved by washing this resin with 5% ammonium hydroxide. The ammonia effluent was concentrated until free of ammonia. The pH of the solution was adjusted to 5.1 with hydrochloric acid, and, after filtering through diatomaceous earth filter aid, the solution was concentrated and poured into 5 volumes of methanol. The precipitate was washed and dried. Chromatographs of the material showed it to be L-lysine hydrochloride with only traces of other amino acids.

EXAMPLE 3

*Racemization of the recovered diaminopimelic acid and conversion to L-lysine*

A 5% aqueous solution of the unchanged diaminopimelic acid, recovered as described in Example 2, was prepared in 5 normal hydrochloric acid. This was sealed in a pressure vessel and heated at 180° C. for 13 hours. The vessel was opened and the hydrochloric acid was removed by evaporating the solution to dryness. The residue was dissolved in water and the pH of the solution adjusted to 7.5 with sodium hydroxide. This solution was then treated as in Example 2 with the dried acetone powder preparation of *Aerobacter aerogenes* ATCC 12409. L-lysine was obtained in 67% yield, i.e., 67% of the initial diaminopimelic acid had been converted to L-lysine.

Identification of lysine as the sole product of the enzymatic decarboxylation of the diaminopimelic acid was made by means of paper chromatography. A sample of the reaction mixture was spotted on Whatman No. 1 filter paper and developed using a mixture of methanol: water:10N hydrochloric acid:pyridine (80:17.5:2.5:10) as the ascending phase. Comparison of the reaction mixture with an enzyme mixture showed that only lysine was formed. The amount of L-lysine formed was determined enzymatically by treating a sample with L-lysine decarboxylase (International Minerals and Chemical Corp., Chicago, Ill.) and measuring the amount of carbon dioxide released. Paper chromatography of the assayed sample using the same solvents showed that all of the lysine had been converted to cadaverine.

EXAMPLE 4

A sample of 3.6 mg. of pure D-diaminopimelic acid in 2.0 ml. of 1 N hydrochloric acid was sealed in a micro-Carius tube and heated at 170° C. for 48 hours. The amount of carbon dioxide released during enzymatic treatment of the racemized sample showed that 2.3 mg. or 64% of the D-diaminopimelic acid had been racemized and converted to L-lysine.

The racemization of D-diaminopimelic acid in alkaline solution was demonstrated by heating 5.3 mg. of D-diaminopimelic acid in 2 ml. of 1 N sodium hydroxide at 150° C. for 20 hours in a sealed micro-Carius tube. The amount of carbon dioxide released by enzymatic treatment of the product indicated that 0.6 mg. or 15% had been converted to L-lysine.

A sample of 7.3 mg. of D-diaminopimelic acid in 2.0 ml. of 0.2 N sodium hydroxide was sealed in a micro-Carius tube and heated for 48 hours at 170° C. The amount of carbon dioxide released during the enzymatic treatment of the racemized sample showed that 1.5 mg. or 21% of the D-diaminopimelic acid had been converted to L-lysine.

Since many different embodiments of the invention may be made without departing from the spirit and scope thereof, it is to be understood that the invention is not limited by the specific illustrations except to the extent defined in the following claims.

We claim:

1. The process for converting chemically synthesized diaminopimelic acid containing a substantial proportion of D-diaminopimelic acid to L-lysine which comprises treating the diaminopimelic acid with monodecarboxylation enzymes in aqueous solution at 20° to 45° C. and a pH of 6.5 to 8.5, to produce a reaction mixture containing L-lysine and unchanged D-diaminopimelic acid separately recovering the L-lysine produced and unchanged diaminopimelic acid from the reaction mixture, racemizing the recovered diaminopimelic acid by heating in aqueous acid solution at 125° to 230° C. until treatment of the racemized diaminopimelic acid with monodecarboxylation enzymes as before will convert a major part of the racemized diaminopimelic acid to L-lysine, so treating the racemized diaminopimelic acid with enzymes to produce L-lysine, and recovering the additional L-lysine produced from the reaction mixture.

2. A process as defined in claim 1 wherein the monodecarboxylation enzymes are produced by the organism *Aerobacter aerogenes*.

3. A process as defined in claim 1 wherein the monodecarboxylation enzymes are produced by a strain of *Escherichia coli* which does not require lysine for growth.

4. A process as defined in claim 1 wherein the monodecarboxylation enzymes are produced by the organism *Bacillus sphaericus*.

5. A process as defined in claim 1 wherein the monodecarboxylation enzymes are produced by the organism *Sarcina lutea*.

6. A process as defined in claim 1 wherein the monodecarboxylation enzymes are produced by the organism *Sarcina ureae*.

7. In the process for converting chemically synthesized diaminopimelic acid containing a substantial proportion of D-diaminopimelic acid to L-lysine by treatment with monodecarboxylation enzymes to produce a reaction mixture containing L-lysine and unchanged D-diaminopimelic acid, the improvement for obtaining high yields of L-lysine from the chemically synthesized diaminopimelic acid which comprises recovering the unchanged diaminopimelic acid from the reaction products, racemizing the recovered diaminopimelic acid by heating in aqueous acid solution at 125° to 230° C. until treatment of the racemized diaminopimelic acid with monodecarboxylation enzymes as before will convert 62–70% of the racemized diaminopimelic acid to L-lysine, and repeating the process for converting diaminopimelic acid to L-lysine to obtain additional L-lysine.

8. The process for converting D-diaminopimelic acid to L-lysine which comprises treating an aqueous solution of D-diaminopimelic acid with acid at 125° to 230° C., treating the racemized diaminopimelic acid with monodecarboxylation enzymes in aqueous solution at 20° to 45° C. and a pH of 6.5 to 8.5, and recovering the L-lysine produced.

9. The process for converting chemically synthesized diaminopimelic acid containing a substantial proportion of D-diaminopimelic acid to L-lysine which comprises mixing a 0.1% to 3% aqueous solution of the diaminopimelic acid at 20° to 45° C. and a pH of 6.5 to 8.5 with 5 to 20 parts per 1000 parts solution of enzymes produced by the organism *Aerobacter aerogenes* to produce a reaction mixture containing L-lysine and unchanged D-diaminopimelic acid, separately recovering L-lysine and unchanged diaminopimelic acid from the reaction mixture, preparing a 0.5% to 10% aqueous solution of the recovered diaminopimelic acid in 0.1 to 10 normal acid, heating the solution at 150° to 200° C. to racemize the diaminopimelic acid until treatment of the racemized diaminopimelic acid with monodecarboxylation enzymes as before will convert 62–70% of the racemized diaminopimelic acid to L-lysine, repeating the step of mixing with enzymes to convert a major part of the racemized diaminopimelic acid to L-lysine, and recovering the additional L-lysine from the reaction mixture.

References Cited in the file of this patent

Dewey et al.: Biochemical Journal 58 (1954), pages 523–531 POSL QP 501–B47.

Fieser et al.: Organic Chemistry, 3rd Ed. (1956), Reinhold Publ. Corp., New York, pages 274–276.

UNITED STATES PATENT OFFICE
CERTIFICATION OF CORRECTION

Patent No. 2,976,218             March 21, 1961

Bert S. Gorton et al.

It is hereby certified that error appears in the above numbered patent requiring correction and that the said Letters Patent should read as corrected below.

Column 1, line 23, for "77" read -- 77 --; line 42, for "58" read -- 58 --; column 2, line 36, for "of" read -- to --; line 67, for "38" read -- 38 --; column 3, line 14, for "spaericus" read -- sphaericus --.

Signed and sealed this 8th day of August 1961.

(SEAL)
Attest:

ERNEST W. SWIDER             DAVID L. LADD
Attesting Officer             Commissioner of Patents